United States Patent [19]
Weber et al.

[11] 3,860,419
[45] Jan. 14, 1975

[54] PROCESS FOR THE RECOVERY OF MOLYBDENUM FROM ROASTED MOLYBDENUM CONCENTRATES

[75] Inventors: Theodor Alexander Weber, Jerstedt; Ralf Fritz Borrmann, Oker, both of Germany

[73] Assignee: Hermann C. Starck Berlin, Berlin, Germany

[22] Filed: Dec. 12, 1972

[21] Appl. No.: 314,472

[30] Foreign Application Priority Data
Dec. 14, 1971 Germany............................ 2162065

[52] U.S. Cl......................... 75/103, 423/53, 75/121
[51] Int. Cl.............................................. C22b 3/00
[58] Field of Search.................. 75/101 R, 103, 121; 423/53, 56, 593

[56] References Cited
UNITED STATES PATENTS
3,739,057   6/1973   Daugherty et al................ 423/56 X Primary Examiner—Oscar R. Vertiz
Assistant Examiner—Ethel R. Cross
Attorney, Agent, or Firm—Karl F. Ross; Herbert Dubno

[57] ABSTRACT

A process for recovering molybdenum, either as a compound or as the elemental metal, from roasted molybdenum concentrates, e.g. resulting from the roasting of molybdenum sulfide compositions, comprises digesting the concentrate in aqueous nitric acid containing ammonium nitrate, separating the solid phase from the liquid phase, and treating the solid phase with alkali, preferably ammonium hydroxide, to produce ammonium molybdate. The latter may be converted into metallic molybdenum.

7 Claims, No Drawings

PROCESS FOR THE RECOVERY OF MOLYBDENUM FROM ROASTED MOLYBDENUM CONCENTRATES

FIELD OF THE INVENTION

The present invention relates to a method of or a process for the recovery of molybdenum, either as a compound or the elemental metal, from molybdenum-containing concentrates such as may be produced by the roasting of molybdenum sulfide compositions.

BACKGROUND OF THE INVENTION

Practically the only economically processable molybdenum-containing mineral or ore is molybdenum disulfide which occurs naturally in the presence of other metallic sulfides, especially copper sulfides, which may constitute undesirable impurities in systems for recovering molybdenum from such ores.

It has been proposed to separate the molybdenum disulfide component from the other sulfides by flotation, but this technique is satisfactory only for the heavier compounds and does not permit an adequate separation of the copper compounds from those of molybdenum. Recourse may be had to fractional flotation and other techniques of low efficiency and high cost which, by repetition, increase the recovery of the molybdenum-containing compound. In substantially all of the prior-art techniques, however, the molybdenum solid concentrate contains substantial proportions of copper, or at least a sufficiently high copper concentration to adversely affect various applications for the molybdenum.

The molybdenum disulfide composition is customarily roasted in the presence of air to release the sulfur as sulfur dioxide and form a concentrate containing molybdenum in its oxidic state.

Molybdenum as a metal is desirable in steel metallurgy and, as a metal or compound, has catalytic activity for many purposes in the chemical industry. However, the presence of impurities such as copper and alkali metals which are found in the roasted concentrate, interferes with such uses of the molybdenum product and has necessitated further purification. It should be noted also that impurities such as lead and alkaline-earth metals may also be present with similar disadvantages.

While various techniques have been provided heretofore for purification of the molybdenum product, i.e. for removal of impurities from a molybdenum oxide concentrate formed by roasting the molybdenum sulfide ores described above, they have generally been found to be unsatisfactory, either because of pure economy or because they are insufficiently effective in elimination of impurities. For example, sublimation techniques in which the molybdenum oxide concentrate is heated and a solid molybdenum product is recovered on a cold surface, has all the disadvantages of a gas-phase operation and is highly uneconomical. Chlorination techniques, liquid-liquid extraction techniques and ion-exchange procedures also are uneconomical, highly expensive and useful only in the case where high-purity molybdenum products are desired. These techniques cannot practically be used for the production of technical molybdenum of a lesser degree of purity but high utility in the metallurgical and chemical fields.

It has been proposed also to treat the molybdenum oxide concentrate formed by the roasting of molybdenum sulfide ores with water to wash alkalies from the concentrate. These techniques and those which treat the molybdenum composition with hydrochloric acid and ferric chloride, are capable only of yielding products suitable for metallurgical use and containing a high level of impurities rendering the product unsatisfactory for use in chemical practice. Still other techniques remove many of the impurities set forth above but introduce other impurities such as iron which are disadvantageous for some purposes.

OBJECTS OF THE INVENTION

It is the principal object of the present invention to provide an improved process for recovering molybdenum from molybdenum-containing mineral compositions which is economical, efficient and capable of yielding a molybdenum product with sufficiently high purity as to ensure utility for the product.

Another object of the invention is to provide a method of recovering molybdenum, as the metal or as a compound, whereby the disadvantages of the system mentioned above can be obviated.

SUMMARY OF THE INVENTION

These objects and others which will become apparent hereinafter are attained in accordance with the present invention which is based upon our surprising discovery that it is possible to treat a mineral concentrate containing molybdenum oxide in the presence of the impurities noted above, with a solution of a particular nature and thereby promote increased solubilization of the molybdenum with a subsequent treatment.

More particularly, we have found that it is possible to obtain a technical grade of molybdenum or a molybdenum compound, free from significant quantities of the impurities mentioned earlier, from a mineral composition formed by roasting molybdenum disulfide minerals and containing large amounts of the impurities, so that the product can be used in metallurgy and in the chemical industry without difficulties. We have found that roasted molybdenum concentrates can be treated with an aqueous acidic washing or digesting liquid to remove all or part of such impurities and simultaneously increase the solubility of the molybdenum in an alkali medium to a surprising extent, while solubilizing the molybdenum in the initial washing process to a minimum degree. According to the invention, the roasted molybdenum concentrate is treated at an elevated temperature with agitation (e.g., stirring) with a dilute aqueous nitric acid solution containing ammonium nitrate, by removing the liquid phase from the solid phase following extraction for a period which is preferably in excess of 0.5 hour, and thereafter washing the solid phase with small quantities of hot water.

The method of the present invention, for recovering molybdenum from a molybdenum-containing mineral composition in the presence of impurities such as copper, lead, alkali metals and alkaline earth metals, comprises roasting the molybdenum composition to convert the molybdenum therein predominantly to molybdenum oxide, digesting this concentrate in an aqueous nitric acid solution containing ammonium nitrate at an elevated temperature (i.e., a temperature above room temperature and below the boiling point of the aqueous phase), separating the digested concentrate or solid phase from the solution or liquid phase, washing the solid product with a small quantity of hot water (i.e., a quantity equal to or less than that of the solution used for digestion) at a temperature which may be equal to that of digestion, and thereafter treating the washed solid phase with an aqueous alkali solution to solubilize the molybdenum. The alkali is preferably ammonium hydroxide (ammonia water).

The nitric acid solution, according to the present invention, should contain substantially 1.0 to 4.0 moles/liter of free nitric acid and 0.5 to 2.0 moles/liter of ammonium nitrate. The concentrate is preferably digested with this latter solution at a temperature of about 50°C to 100°C for a period up to about two hours, using the solution in a weight ratio to the concentrate of substantially 1:1 to 3:1.

Most advantageously, the concentrate which can contain 1 to 3 percent by weight copper and 0.3 to 1 percent by weight alkali metals is preferably digested with a nitric acid solution containing 2.0 to 2.3 moles/liter of nitric acid and 1.5 to 2.0 moles/liter of ammonium nitrate. The treatment temperature is most advantageously 75°C to 80°C, the latter corresponding to the temperature of the subsequent washing liquid as well, while digestion is carried out for a period of about two hours.

After digestion, the concentrate is hot-filtered and washed on the filter with the hot water. Surprisingly, little, if any, molybdenum is found in the filtrate and most of the impurities are removed thereby. The washed concentrate is then treated with a base such as ammonium hydroxide or sodium hydroxide to solubilize the molybdenum, whereupon a solid phase is again separated from the liquid phase. In this step, the liquid phase is found to contain substantially all of the molybdenum, hardly any remaining in the solid residue. Surprisingly, when molybdenum oxide concentrates without treatment with nitric acid in the presence of ammonium nitrate are subjected to the basic treatment, high concentrations of molybdenum remain in the residue. With the system of the present invention more than 99 percent by weight of the molybdenum is extracted from the solid phase.

SPECIFIC EXAMPLE

In a semicommercial apparatus, 750 kg per day of a roasted concentrate containing 58 to 60 percent by weight molybdenum, 0.5 to 1.0 percent copper and 0.2 to 0.4 percent alkali is treated with 1,200 liters of hot nitric acid solution at a temperature of 75 to 80°C with stirring. The solution contains 135 g of nitric acid/liter and 150 g of ammonium nitrate/liter with stirring. After digestion for two hours, the liquid phase is removed on a suction filter and the solids are washed with a lesser quantity (300 liters) of hot water at the stated temperature. Copper and alkali metals are found to have been 92 to 98 percent removed with the filtrate which consists of the combined washwater and nitric acid solution. 1,500 liters of this solution contains 2 to 3 g of molybdenum per liter, corresponding to 0.6 to 1 percent of the original molybdenum.

Traces of lead and sulfidic sulfur, the latter converted to the sulfate by treatment with the nitric acid, bismuth and zinc are extracted from the solid phase as well.

The solid phase is dissolved in ammonia water (ammonium hydroxide) saturated with $NH_3$ to leave a residue of 40 to 50 kg per ton of the roasted product originally treated. The molybdenum content of the dry residue is 2 to 3 percent by weight with the system of the present invention and 20 to 30 percent when the solid roasted concentrate is treated without the nitric acid digestion step. Thus only about 0.1 to 0.3 percent molybdenum remains in the residue according to the present invention while about 5 percent molybdenum may remain without the nitric acid treatment stage.

From the ammonium molybdate solution, solid ammonium molybdate can be obtained by evaporating to dryness. The ammonium molybdate containing 50 to 80 parts by million of alkali, can be converted into pure molybdenum metal powder finding immediate utility in the metallurgical field. When ammonium molybdate is made from the concentrate without the nitric acid digestion step, it is found to contain 1,000 to 1,500 parts per million of alkali, a level unsatisfactory for the purposes stated.

In practice, the technique has been found to be commercially effective with concentrates containing up to 50 percent molybdenum, 2 to 3 percent copper, high lead concentrates and large concentrations of other impurities as stated earlier.

We claim:

1. A method of recovering roasted molybdenum concentrate containing molybdenum in the presence of impurities of the group which consists of copper, lead, zinc, bismuth, alkali metals and alkalne-earth metals; said method comprising the steps of:
   a. digesting the roasted concentrate in an aqueous nitic acid solution containing ammonium nitrate at a temperature of 50°C to 100°C, said solution containing substantially 1.0 to 4.0 moles/liter of free nitric acid and 0.5 to 2.0 moles/liter of ammonium nitrate;
   b. separating the digested concentrate from the nitric acid solution to yield a solid product; and
   c. washing said solid product with hot water.

2. The method defined in claim 1 wherein said concentrate is digested in step (a) for a period of up to about eight hours, said solution being present in step (a) in a weight ratio to said concentrate of substantially 1:1 to 3:1.

3. The method defined in claim 2 wherein said concentrate is digested in step (a) for a period of about two hours, said solution contains about 2.0 to 2.3 moles/liter of free nitric acid and about 1.5 to 2.0 moles/liter of ammonium nitrate, and said temperature is substantially 75°C to 80°C.

4. A method of recovering roasted molybdenum concentrate containing molybdenum in the presence of impurities, said method comprising the steps of:
   a. digesting the roasted concentrate in an aqueous nitric acid solution containing ammonium nitrate at an elevated temperature;
   b. separating the digested concentrate from the nitric acid solution to yield a solid product; and
   c. washing said solid product with hot water, said concentrate being digested in step (a) for a period of about two hours, said solution contains about 2.0 to 2.3 moles/liter of free nitric acid and about 1.5 to 2.0 moles/liter of ammonium nitrate, and said temperature is substantially 75°C to 80°C, said concentrate is a roasted molybdenum sulfide ore containing impurities selected from the group which consists of copper, lead, zinc, bismuth and alkali metals.

5. The method defined in claim 4, further comprising the step of treating said solid product after step (c) with an alkali selected from the group which consists of ammonium hydroxide and sodium hydroxide to solubilize molybdenum from said solid product.

6. The method defined in claim 5 wherein said solid product is treated subsequent to step (c) with ammonium hydroxide to solubilize molybdenum as ammonium molybdate, further comprising the step of concentrating said alkali by evaporation to precipitate ammonium molybdate.

7. The method defined in claim 6, further comprising the step of converting said ammonium molybdate to metallic molybdenum.

* * * * *